US008839598B2

(12) United States Patent
Shida et al.

(10) Patent No.: US 8,839,598 B2
(45) Date of Patent: Sep. 23, 2014

(54) LAWN MOWING VEHICLE WITH A CONTROL UNIT FOR ELEVATING MECHANISMS

(71) Applicants: IHI Corporation, Tokyo (JP); IHI Shibaura Machinery Corporation, Nagano (JP)

(72) Inventors: Michinori Shida, Yokohama (JP); Ikuo Iwasaki, Yokohama (JP); Fumio Hasegawa, Tokyo (JP); Takaaki Sudoh, Matsumoto (JP); Takushi Kaneko, Matsumoto (JP)

(73) Assignees: IHI Corporation (JP); IHI Shibaura Machinery Corporation (JP)

( * ) Notice: Subject to any disclaimer, the term of this patent is extended or adjusted under 35 U.S.C. 154(b) by 0 days.

(21) Appl. No.: 14/094,103

(22) Filed: Dec. 2, 2013

(65) Prior Publication Data
US 2014/0075902 A1    Mar. 20, 2014

Related U.S. Application Data

(62) Division of application No. 13/522,177, filed as application No. PCT/JP2010/068915 on Oct. 26, 2010, now Pat. No. 8,621,833.

(30) Foreign Application Priority Data

Jan. 13, 2010  (JP) ............... P2010-005025
Jan. 13, 2010  (JP) ............... P2010-005026
Jan. 13, 2010  (JP) ............... P2010-005027
Jan. 13, 2010  (JP) ............... P2010-005028

(51) Int. Cl.
*A01D 34/00*    (2006.01)

(52) U.S. Cl.
USPC ............ 56/17.1; 701/50; 56/7; 56/249

(58) Field of Classification Search
USPC ............ 56/17.1, 7, 249, 15.2, 10.2 E, 10.2 H; 701/50, 22
See application file for complete search history.

(56) References Cited

U.S. PATENT DOCUMENTS 5,417,193 A    5/1995  Fillman et al. ............ 123/352
5,497,604 A    3/1996  Lonn ........................ 56/10.2 H
(Continued)

FOREIGN PATENT DOCUMENTS

CN    101008357 A    8/2007
JP    58-125912      8/1983
(Continued)

OTHER PUBLICATIONS

Japanese Office Action, dated Feb. 18, 2014, issued in corresponding Japanese Patent Application No. 2010-005027. English translation. Total 6 pages.

(Continued)

Primary Examiner — Árpád Fábián-Kovács
(74) Attorney, Agent, or Firm — Ostrolenk Faber LLP

(57) ABSTRACT

A lawn mowing vehicle (1) mows a lawn along the travel path of the vehicle. The lawn mowing vehicle (1) includes: at least one electric reel unit having an electric reel (22) raised and lowered by an electric cylinder (26a-26c); sensors (34a-34c) for detecting the travel speed of the vehicle; and a control device (37) for controlling the electric cylinder (26a-26c) according to the result of the detection by the sensors (34a-34c) to thereby control the elevation position of the electric reel (22).

5 Claims, 7 Drawing Sheets

(56) References Cited

U.S. PATENT DOCUMENTS

| | | | |
|---|---|---|---|
| 6,591,593 B1 | 7/2003 | Brandon et al. | 56/10.6 |
| 6,857,253 B2 | 2/2005 | Reimers et al. | 56/10.6 |
| 6,892,517 B2 | 5/2005 | Adams et al. | 56/10.2 R |
| 7,111,443 B2 | 9/2006 | Anderson et al. | 56/10.8 |
| 7,735,592 B2 | 6/2010 | Bellot et al. | 180/165 |
| 7,788,892 B2 * | 9/2010 | Schmidt et al. | 56/249 |
| 8,109,069 B2 * | 2/2012 | Moe et al. | 56/15.8 |
| 8,621,833 B2 * | 1/2014 | Shida et al. | 56/10.2 H |
| 2004/0055266 A1 * | 3/2004 | Reimers et al. | 56/7 |
| 2005/0257508 A1 * | 11/2005 | Modzik et al. | 56/7 |
| 2007/0204581 A1 * | 9/2007 | Reimers et al. | 56/7 |
| 2009/0188227 A1 | 7/2009 | Bellot et al. | 56/10.6 |
| 2014/0000230 A1 * | 1/2014 | Kohlhase et al. | 56/10.2 E |

FOREIGN PATENT DOCUMENTS

| | | |
|---|---|---|
| JP | 60-156922 | 10/1985 |
| JP | 62-070916 | 4/1987 |
| JP | 1-500562 | 3/1989 |
| JP | 3-083016 | 8/1991 |
| JP | 5-000016 | 1/1993 |
| JP | 5-015232 | 1/1993 |
| JP | 5-503207 | 6/1993 |
| JP | 6-124119 | 5/1994 |
| JP | 09-037631 | 2/1997 |
| JP | 09-074818 | 3/1997 |
| JP | 10-111929 | 4/1998 |
| JP | 10-164954 | 6/1998 |
| JP | 11-085274 | 3/1999 |
| JP | 11-089377 | 4/1999 |
| JP | 2896017 | 5/1999 |
| JP | 2000-139157 | 5/2000 |
| JP | 2002-291114 | 10/2002 |
| JP | 2004-213627 | 7/2004 |
| JP | 2005-198594 | 7/2005 |
| JP | 2005-304428 | 11/2005 |
| JP | 2006-087405 | 4/2006 |
| JP | 3944215 | 7/2007 |
| JP | 2008-029286 | 2/2008 |
| JP | 2009-174539 | 8/2009 |
| WO | WO 91/03927 | 4/1991 |

OTHER PUBLICATIONS

Chinese Office Action, dated Mar. 27, 2014, issued in corresponding Chinese Patent Application No. 201080060809.3, filed Oct. 26, 2010. English translation of Search Report. Total 14 pages.

Japanese Office Action, dated May 20, 2014, issued in corresponding Japanese Patent Application No. 2010-005028. English translation. Total 4 pages.

Japanese Office Action, dated Jun. 3, 2014, issued in corresponding Japanese Patent Application No. 2010-005026. English translation. Total 9 pages.

Korean Office Action, dated Jul. 18, 2014, issued in corresponding Korean Patent Application No. 10-2014-7009053. English translation. Total 7 pages.

* cited by examiner

LAWN MOWING VEHICLE WITH A CONTROL UNIT FOR ELEVATING MECHANISMS

CROSS-REFERENCE TO RELATED APPLICATIONS

This application is a divisional of U.S. patent application Ser. No. 13/522,177, filed Jul. 13, 2012, which is a 35 U.S.C. §371 national phase conversion of PCT/JP2010/068915, filed Oct. 26, 2010, which claims priority of Japanese Patent Application Nos. 2010-005025, 2010-005026, 2010-005027, and 2010-005028, filed on Jan. 13, 2010, the contents of all of which are incorporated herein by reference. The PCT International Application was published in the Japanese language.

FIELD OF THE INVENTION

The present invention relates to a lawn mowing vehicle.

BACKGROUND ART

As is well known, lawn mowing vehicles having reel units are classified roughly into lawn mowing vehicles that mow a lawn when manipulated by a worker, and lawn mowing vehicles that automatically mow a lawn without manipulation of a worker (automatic lawn mowing vehicles). The former lawn mowing vehicles are generally classified into hand-driven type (walk-behind type) lawn mowing vehicles that are operated by a worker located at the rear thereof, and riding lawn mowing vehicles that are operated by a worker who boards the vehicle, and mow a lawn while traveling according to the operation of the worker. In contrast, the latter lawn mowing vehicles (automatic lawn mowing vehicles) travel according to a result of determination of a travel path or a lawn mowing situation that is previously set, and thus automatically mow a lawn without the operation of the worker.

The automatic lawn mowing vehicle typically has a larger area in which a lawn can be mowed in one pass than the hand-driven type lawn mowing vehicle. As such, the hand-driven type lawn mowing vehicle is often used to mow a lawn of a narrow range (e.g., a private yard) or to precisely mow a lawn of each green in a golf course, and a riding lawn mowing vehicle is often used to mow a lawn with a wide range (e.g. greens in a golf course or a sports ground).

An example of the hand-driven type lawn mowing vehicle is disclosed in U.S. Pat. No. 7,111,443, in which a motor is driven by power supplied from a battery, and a lawn mowing unit is operated by a driving force of the motor. Further, an example of a lawn mowing unit is disclosed in Published Japanese Translation No. H05-503207 of the PCT International Publication, which includes an adjustment mechanism capable of adjusting a mowing height of grass, without complicating or interfering with the mechanism.

An example of the riding lawn mowing vehicle is disclosed in Japanese Unexamined Patent Application, First Publication No. 2000-139157, which is configured to be able to move up and down reel units using hydraulic cylinders. In detail, the riding lawn mowing vehicle is allowed to switch back pressure for elevating cylinders, which move up and down three reel units disposed in the front of the vehicle, depending on the slope or unevenness of a working surface, thereby realizing stable work with mowing the lawn while still maintaining a traveling speed without delay of downward movement of the reel units.

Such a riding lawn mowing vehicle is disclosed in Japanese Unexamined Patent Application, First Publication No. H09-074818 (hereinafter "JP-H09-074818"), in which a plurality of electrode parts detecting cropped traces are installed on a bottom portion of the vehicle; a change in voltage between when the electrode parts are electrically conducted by contact with grass and when the electrode parts are insulated by non-contact with the grass is detected; and a cropped-trace boundary that is a boundary between an uncropped area and a cropped area is detected using the detected result. Further, an automatic travel working vehicle is disclosed in Japanese Unexamined Patent Application, First Publication No. S62-070916, in which a predetermined range in front of the vehicle is captured by a camera during radiating strobe light, and predetermined treatment is performed on a captured image, thereby detecting a boundary between an untreated work area and a treated work area. Furthermore, a method of classifying vitality of vegetation into "soundness," "caution," "warning," and "diseased" from a histogram obtained by analyzing reflection information (brightness information image) from the vegetation caught by a video camera, and evaluating a variation in the vitality of vegetation which is easily understood by a human being is disclosed in Japanese Unexamined Patent Application, First Publication No. 2004-213627.

Such an automatic lawn mowing vehicle is disclosed in Japanese Patent No. 2896017 (hereinafter "JP 2896017"), which is configured so as to be able to discriminate a boundary located on each of left and right sides of a vehicle body (a boundary between a treated work area in which a lawn has been mowed and an untreated work area in which a lawn has not been mowed), and to automatically balance positions in a widthwise direction of the vehicle body with regard to these boundaries, thereby enabling a lawn to be properly mowed.

Further, an example of the riding lawn mowing vehicle is disclosed in Japanese Unexamined Patent Application, First Publication No. H11-089377 (hereinafter "JP-H11-089377"), in which reel units are elevated using hydraulic cylinders. In detail, the riding lawn mowing vehicle includes three reel units disposed in the front thereof and two reel units disposed on left and right sides thereof. When the reel units are lowered, oil channels for the hydraulic cylinders, which elevate the two reel units disposed on left and right sides of the vehicle, are blocked to prevent the two reel units from being lowered. Thereby, a mowing width can be narrowed.

DISCLOSURE OF THE INVENTION

Problems to be Solved by the Invention

However, to neatly mow a lawn at a uniform height, mowing conditions of the lawn need to be constantly maintained. This is because, if the mowing conditions are changed depending on a place, uneven cutting of the lawn is caused, which reduces mowing quality. To secure constant mowing conditions of the lawn, it is necessary to constantly maintain a ratio of a traveling speed of the vehicle to a rotational speed of a cutter (cutter mowing a lawn, which is called a reel) installed on a reel unit.

Fundamentally, the conventional lawn mowing vehicles constantly maintain a traveling speed while rotating a cutter at a constant rotational speed, thereby preventing mowing quality from being reduced. Particularly, the riding lawn mowing vehicles have difficulty in precisely controlling the rotational speed of the cutter because both the wheels and the cutter are driven using a driving force of the engine, or because the cutter is driven using a driving force of the motor. As such, in the related art, the position of an accelerator is mechanically set to be constant on the assumption that the rotational speed of the cutter is made constant. Thereby, both the rotational speed of the cutter and the traveling speed of the vehicle are made constant.

Further, in a conventional riding lawn mowing vehicle in which a plurality of elevatable reel units are installed at different positions in the frontward/rearward direction of the vehicle, an elevating position of a reel unit (hereinafter referred to as a "front reel unit") installed in the front of the vehicle and an elevating position of a reel unit (hereinafter referred to as a "rear reel unit") installed in the rear of the vehicle are required to be matched with each other. This is because, when the front reel unit and the rear reel unit are elevated at the same time, a portion of the lawn which is mowed only by the front reel unit and a portion of the lawn which is mowed only by the rear reel unit are generated, and thus an overmowed or undermowed portion is generated.

In order to match the elevating positions of the front reel unit and the rear reel unit with each other, the rear reel unit need only be elevated at a position at which the vehicle travels from a position at which the front reel unit is elevated by an interval between the front reel unit and the rear reel unit. However, since it is difficult to precisely control the conventional riding lawn mowing vehicle that elevates the reel unit using a hydraulic cylinder, the rear reel unit is elevated after a predetermined time has elapsed while elevating the front reel unit, regardless of the traveling speed of the vehicle.

However, the ground on which the grass grows is not necessarily flat, but may have ups and downs. For example, the greens of a golf course are full of ups and downs formed intentionally in order to increase a level of difficulty of play. When the grass, which grows on the ground having such ups and downs, is mowed by a lawn mowing vehicle, a traveling speed of the lawn mowing vehicle is automatically changed depending on the ups and downs of the ground even if an accelerator position is mechanically set to be constant. Thereby, there is a problem in that a mowing quality is reduced.

Further, when the traveling speed of the lawn mowing vehicle is automatically changed, a difference between the elevating positions of the front reel unit and the rear reel unit is caused. Thereby, the mowing quality is also reduced.

Incidentally, determination of, e.g., a growth state of the lawn and management of a height of the grass are basically performed on the basis of experience of a worker. That is, the worker manages the height of the grass by visually determining the growth state of the lawn, adjusting a height adjusting mechanism installed on the lawn mowing vehicle depending on the growth state, and mowing the lawn. However, all workers who operate the lawn mowing vehicle cannot necessarily properly determine the growth state of the lawn and perform proper management corresponding to the determined result. For this reason, if the growth state of the lawn is automatically detected and the detected result is provided to a worker, this is very useful to the worker, and is considered to be able to increase an added value of the lawn mowing vehicle.

Furthermore, when the lawn is mowed, it is necessary to minimize a chance of the lawn being mowed again at a treated work area at which the lawn has already been mowed. This is because, when the mowing is repeated several times, a portion of the lawn which is unnecessarily mowed is generated, and thus uneven mowing occurs, which reduces the mowing quality. Since the lawn mowing vehicles disclosed in JP-H09-074818 and JP 2896017 above detects the boundary between the treated work area where the lawn has been mowed and the untreated work area at which the lawn has not yet been mowed, if the lawn mowing vehicle travels so as not to mow the lawn of the treated work area along the boundary, the mowing equality of the lawn is considered to be able to be prevented from being reduced.

However, in the case in which the lawn is mowed so that a width of the lawn to be mowed is narrower than a mowing width of the vehicle, even when the vehicle travels along the boundary, many portions of the lawn which are mowed several times are generated. As such, the mowing quality of the lawn is reduced. As in the lawn mowing vehicle disclosed in JP-H11-089377, if the mowing width is narrowed, the portions of the lawn which are mowed several times can be reduced. As such, it is possible to prevent the mowing quality of the lawn from being reduced. However, the conventional lawn mowing vehicle that elevates the reel units using the hydraulic cylinders has a problem in that there is a risk of an adverse effect that the grass is withered by leaked oil. Further, the conventional lawn mowing vehicle basically elevates and rotates all the reel units in the same way, and thus has a problem in that unnecessary consumption of energy is frequent.

Accordingly, the present invention has been made keeping in mind the above problems occurring in the related art, and the present invention is directed to a lawn mowing vehicle, in which a high quality of lawn mowing is possible even with a change in traveling speed of the vehicle. Further, the present invention is directed to a lawn mowing vehicle, in which, even when the traveling speed is changed, the elevating positions of the reel units can be matched with each other, and the lawn can be mowed with a high quality.

Further, the present invention is directed to a lawn mowing vehicle having a higher added-value, capable of automatically measuring a growth state of a lawn, and providing useful information in managing the lawn.

In addition, the present invention is directed to a lawn mowing vehicle capable of performing a high quality of lawn mowing with low power consumption without causing an adverse effect such as withering of grass.

Means for Solving the Problem

According to a first aspect of the present invention, a lawn mowing vehicle (1, 2), which mows a lawn along a travel path, includes: at least one electric reel unit (13a, 13b, 14) having a rotating blade (22) driven by a motor (24); a speed detection unit (34a to 34c, 37, 40) detecting a traveling speed of the vehicle; and a control unit (37, 40) that controls the motor depending on the detected result of the speed detection unit, thereby controlling a rotational speed of the rotating blade installed on the electric reel unit. The rotating blade is configured so that a rotational shaft thereof is set in a leftward/rightward direction of the vehicle with respect to the traveling direction, and the speed detection unit detects the traveling speed of the vehicle on the basis of revolutions per unit time of wheels installed on the vehicle and effective diameters of the corresponding wheels.

When revolutions per unit time of a plurality of wheels installed on the vehicle are different, the speed detection unit may obtain an average value of the revolutions per unit time of the plurality of wheels.

The control unit may control a rotational speed of the rotating blade on the basis of a number of blades of the electric reel unit and a mowing pitch of the lawn (a target interval of the lawn) which is arbitrarily set in advance in addition to the detected result of the speed detection unit.

The control unit may control a rotational speed of the rotating blade so that the rotational speed of the rotating blade is proportional to the detected result of the speed detection unit.

The control unit may control a rotational speed of the rotating blade so that the rotational speed of the rotating blade varies step-by-step with respect to the detected result of the speed detection unit.

According to a second aspect of the present invention, a lawn mowing vehicle (4, 402), which has first and second reel units (13a, 13b, 14) disposed at positions that are different from each other in a frontward/rearward direction thereof with respect to a traveling direction, includes: a first elevating mechanism that elevates the first reel unit using an electric actuator (26a, 26b); a second elevating mechanism that elevates the second reel unit using an electric actuator; a speed detection unit (34a to 34c, 37, 40) that detects a traveling speed of the vehicle; and a control unit (437, 440) that controls the first and second elevating mechanisms depending on the detected result of the speed detection unit so that an elevating position of the first reel unit is consistent with that of the second reel unit. The first and second reel units are electric reel units, each of which has a rotating blade (22) driven by a motor (24) and is configured so that a rotational shaft of the rotating blade is set in the leftward/rightward direction that intersects the traveling direction of the vehicle, and the control unit changes a time from when the first reel unit begins to be elevated to when the second reel unit begins to be elevated depending to the detected result of the speed detection unit.

Further, the lawn mowing vehicle related to the second aspect of the present invention may include an input unit (427) that inputs an instruction of whether or not to perform automatic elevation control that is control of matching elevating positions of the first and second reel units with each other. The control unit may perform the automatic elevation control when the instruction to perform the automatic elevation control is received from the input unit.

When there is no instruction to perform the automatic elevation control, the control unit may control the first and second reel units so as to be individually elevated depending on the instruction input from the input unit.

According to a third aspect of the present invention, a lawn mowing vehicle (5, 502), which has at least one of first and second reel units (13a, 13b) disposed at positions that are different from each other in a leftward/rightward direction thereof with respect to a traveling direction, includes: a first elevating mechanism (25a, 26a) that elevates the first reel unit using an electric actuator (26a); a second elevating mechanism (25b, 26b) that elevates the second reel unit using an electric actuator (26b); and a control unit (537, 540) that controls the first and second elevating mechanisms and individually elevates the first and second reel units. The vehicle includes a selection unit (527) that selects an elevating reel unit from among the first and second reel units, and the control unit performs control of elevating the reel unit selected by the selection unit.

The first and second reel units may be electric reel units, each of which has a rotating blade (22) driven by a motor (24) and is configured so that a rotational shaft of the rotating blade is set in the leftward/rightward direction that intersects the traveling direction of the vehicle.

Effects of the Invention

According to the present invention, since the rotational speed of the rotating blade installed on the electric reel unit is controlled by controlling the motors depending on the detected result of the speed detection unit, even when the traveling speed of the lawn mowing vehicle is changed, a high quality of lawn mowing is possible.

Further, the state of the lawn mowed by the rotating blade is detected by the detection sensor, and a predetermined process is performed on the detected result of the detection sensor. Thereby, the growth data indicating the growth situation of the lawn is generated, and the generated growth data is displayed on the display unit. As such, it is possible to provide a higher value-added lawn mowing vehicle that can provide useful information in managing the lawn.

According to the present invention, the first and second elevating mechanisms are controlled depending on the detected result of the speed detection unit so that the elevating position of the first reel unit is consistent with that of the second reel unit. As such, even when the traveling speed of the lawn mowing vehicle is changed, a high quality of lawn mowing is possible.

Further, the control unit can control the first and second elevating mechanisms, each of which has the electric actuator, to individually elevate the first and second reel units, and elevate and operate a minimum necessary reel unit to mow the lawn. As such, the high quality of lawn mowing can be performed with low power consumption without causing an adverse effect such as withering of the grass.

EMBODIMENTS OF THE INVENTION

Hereinafter, a lawn mowing vehicle according to embodiments of the present invention will be described in detail with reference to the drawings.

First Embodiment

Figure 1:
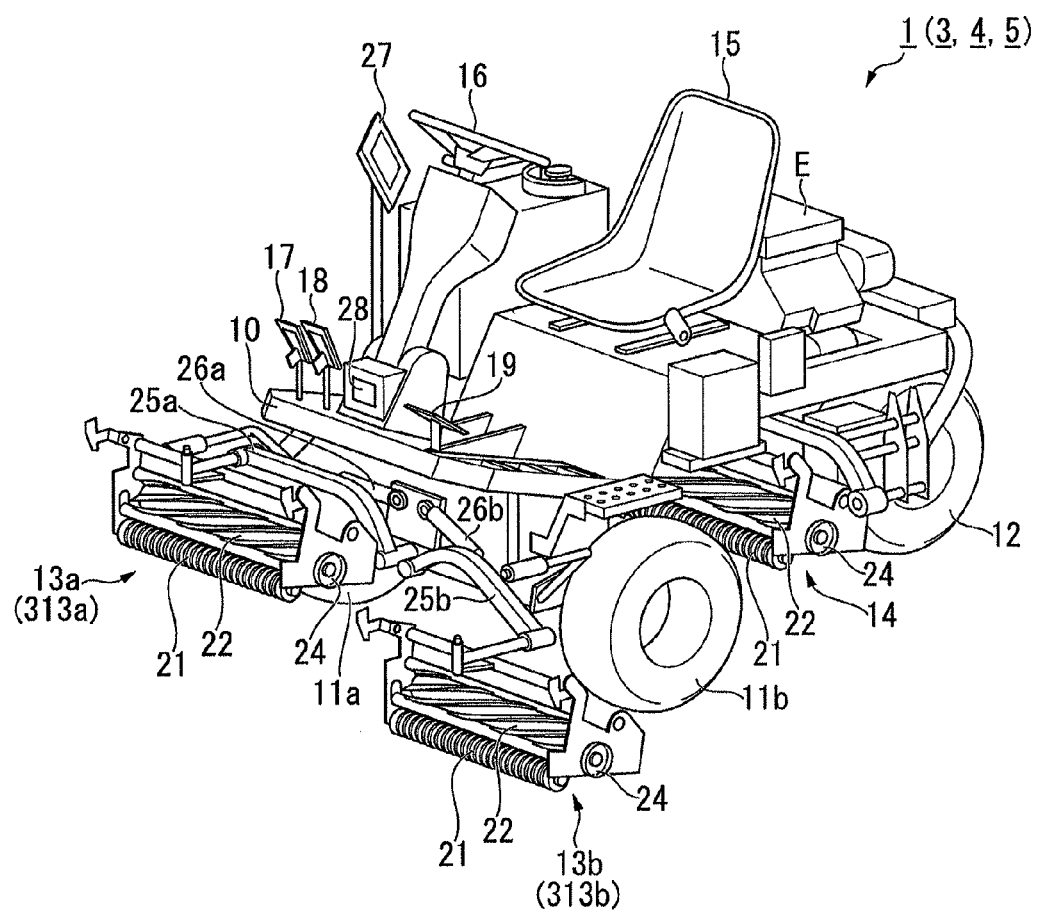
FIG. 1 is a perspective view showing an external appearance of a lawn mowing vehicle according to a first embodiment of the present invention.

FIG. 1 is a perspective view showing an external appearance of a lawn mowing vehicle according to a first embodiment of the present invention. Hereinafter, the lawn mowing vehicle will be described using a riding lawn mowing vehicle as an example, but the present embodiment may also be applied to a hand-driven lawn mowing vehicle. As shown in FIG. 1, the lawn mowing vehicle 1 of the present embodiment includes two front wheels 11a and 11b and one rear wheel 12, and two front reel units (electric reel units) 13a and 13b and one rear reel unit (electric reel unit) 14, all of which are supported on a frame 10. The lawn mowing vehicle 1 travels via the front wheels 11a and 11b and the rear wheel 12, and mows a lawn via the front reel units 13a and 13b and the rear reel unit 14 along a travel path. The lawn mowing vehicle 1 is a hybrid type lawn mowing vehicle that travels using power of its engine and mows a lawn using the power of, for example, a motor.

A seat 15 on which a worker sits is installed on approximately a middle upper portion of the frame 10. A steering wheel 16 is installed on a front upper portion relative to the seat 15. A reverse accelerator pedal 17, an advance accelerator pedal 18, and a brake pedal 19 are installed on a front lower portion relative to the seat 15. The worker sitting on the seat 15 manipulates the steering wheel 16, and thus a traveling direction of the lawn mowing vehicle 1 is determined. The worker manipulates the reverse accelerator pedal 17, the advance accelerator pedal 18, and the brake pedal 19, and thus backward movement, forward movement, stopping, and a traveling speed of the lawn mowing vehicle 1 are determined.

The front wheels 11a and 11b are installed respectively on a right-hand front lower portion and a left-hand front lower portion of the frame 10, are driven by power of a hydraulic motor directly coupled to the engine E, and are supported on the frame 10 in a leftward/rightward direction so as to be able to rotate about a rotational shaft. The rear wheel 12 is installed on a middle rear lower portion of the frame 10, is driven by power of the hydraulic motor in the same way as the front wheels 11a and 11b in the event of three-wheel driving, and freely rotates in the event of two-wheel driving. However, unlike the front wheels 11a and 11b, the rear wheel 12 is configured so as to be able to fluctuate in the leftward/rightward direction in proportion to an amount of rotation of the steering wheel 16. Since the rotational shaft of the rear wheel 12 also fluctuates in accordance with the leftward/rightward fluctuation of the rear wheel 12, the traveling direction of the lawn mowing vehicle 1 is changed by the rotation of the steering wheel 16. The lawn mowing vehicle 1 is equipped with a mechanism (so-called power steering) that assists in steering the steering wheel 16 using the power of the engine E.

Each of the front wheels 11a and 11b and the rear wheel 12 employs a wide tire whose shoulder is formed in a smooth curved surface. This is intended to avoid damage to the lawn by distributing weight and stress of the lawn mowing vehicle 1 which are applied to the front wheels 11a and 11b and the rear wheel 12. Further, each of the front wheels 11a and 11b and rear wheel 12 employs a tire with no groove formed therein. This is intended to prevent a striped pattern from being formed on the lawn by producing a treaded portion (portion at which no groove is formed) and an untreaded portion (portion at which the groove is formed).

The front reel units 13a and 13b are elevatably supported in the front of the front wheels 11a and 11b, respectively, and are lowered to mow the lawn in front of the front wheels 11a and 11b in contact with the ground. Each of the front reel units 13a and 13b includes a front roller 21, an electric reel (rotating blade) 22, a rear roller (not shown), and a motor 24. The front roller 21 is substantially a cylindrical member in which a rotational shaft thereof is installed in the leftward/rightward direction of the vehicle and in which a plurality of grooves, each of which is formed in a circumferential direction, are also formed in an axial direction, and are disposed in front of the electric reel 22. The front roller 21 is installed to arrange the grass that has not yet been mowed by the electric reel 22, and to support the front reel unit 13a or 13b, which is in a lowered state, on the ground.

The electric reel 22 is a substantially cylindrical member in which a plurality of spiral blades for mowing the lawn are formed on a side thereof, whose rotational shaft is set in the leftward/rightward direction of the vehicle, and which are driven by the motor 24. The electric reel 22 is interposed between the front roller 21 and the rear roller (not shown), and is disposed so as to be higher than the front roller 21 and the rear roller (not shown) by a height of the grass that has been mowed. A height position of the electric reel 22 in relation to the front roller 21 and the rear roller (not shown) can be precisely adjusted, for instance, within a range of several millimeters to tens of millimeters. The rear roller (not shown) is a substantially cylindrical member in which grooves as in the front roller 21 are not formed, and is installed to support the front reel unit 13a or 13b, which is in the lowered state, on the ground, like the aforementioned front roller 21.

The frame 10 is provided with a support arm 25a that extends from a middle portion in a rightward direction and a support arm 25b that extends from the middle portion in a leftward direction, at a front portion thereof. The support arm 25a fluctuably supports the front reel unit 13a around the rotational shaft in a frontward/rearward direction of the vehicle at a right-hand end thereof, and the support arm 25b fluctuably supports the front reel unit 13b around the rotational shaft in the frontward/rearward direction of the vehicle at a left-hand end thereof. As such, even when the ground is inclined in the frontward/rearward direction of the vehicle, the front reel units 13a and 13b can be inclined in response to the inclination.

The support arms 25a and 25b are provided with electric cylinders 26a and 26b as actuators. When the electric cylinder 26a is expanded or contracted, the right-hand end of the support arm 25a moves in an upward/downward direction. Thereby, the front reel unit 13a is raised or lowered. Similarly, when the electric cylinder 26b is expanded or contracted, the left-hand end of the support arm 25b moves in the upward/downward direction. Thereby, the front reel unit 13b is raised or lowered. FIG. 1 shows that the front reel unit 13a is in a raised state, while the front reel unit 13b is in a lowered state.

The rear reel unit 14 is elevatably supported between the front wheels 11a and 11b and the rear wheel 12, and is lowered to mow grass in front of the rear wheel 12 in contact with the ground. Like the front reel units 13a and 13b, the rear reel unit 14 includes a front roller 21, an electric reel (rotating blade) 22, a rear roller (not shown), and a motor 24, and is raised or lowered by an elevating mechanism (not shown) having, for instance, an electric cylinder (electric actuator) similar to the electric cylinders 26a and 26b. Like the front reel units 13a and 13b, the rear reel unit 14 is also fluctuably supported around the rotational shaft in the frontward/rearward direction of the vehicle, and can be inclined in response to an inclination of the ground in the frontward/rearward direction of the vehicle.

Further, a touch panel type display device (e.g., a liquid crystal display device) 27 (an input unit, a display unit, and a selection unit) is installed on the right-hand in front of the seat 15 (right-hand side of the steering wheel 16). The display device 27 receives instructions from a worker, and simultaneously displays various pieces of information such as information showing a current state of the lawn mowing vehicle 1. The elevation of each of the front reel units 13a and 13b and the rear reel unit 14, and a start and stop of the electric reel 22 installed on each reel unit are controlled in response to the instruction input by the worker operating the display device 27. The information displayed on the display device 27 includes information such as information showing a traveling speed of the lawn mowing vehicle 1, rotational speeds of the electric reels 22 installed on the front reel units 13a and 13b and the rear reel unit 14, and a growth situation of the lawn. Further, a lighting device 28 illuminating the front of the lawn mowing vehicle 1 is installed between the advance accelerator pedal 18 and the brake pedal 19 below the steering wheel 16.

Figure 2:
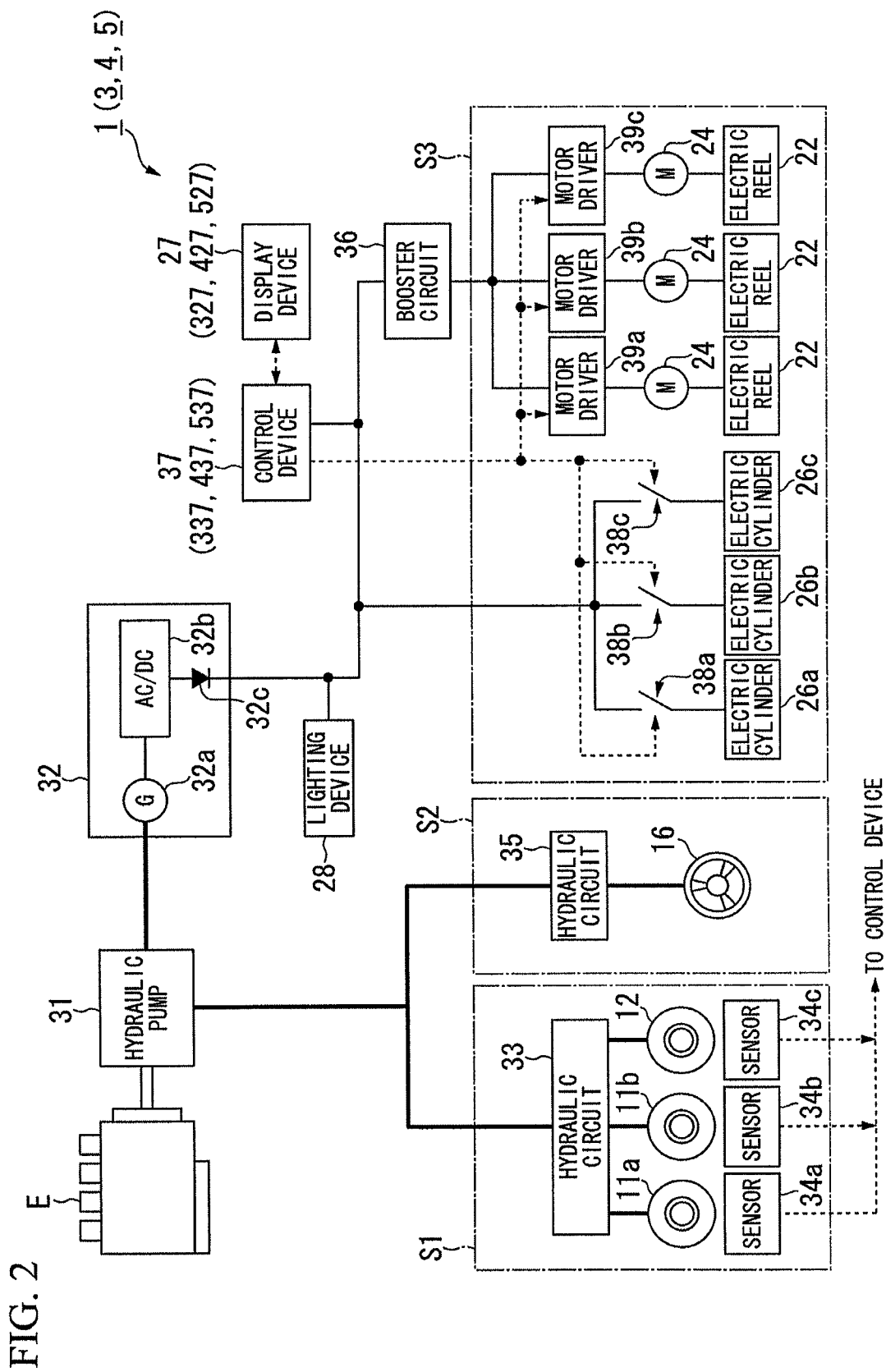
FIG. 2 is a block diagram showing a configuration of essential units of a power system and a control system in the lawn mowing vehicle according to the first embodiment of the present invention.

FIG. 2 is a block diagram showing a configuration of essential units of a power system and a control system in the lawn mowing vehicle according to the first embodiment of the present invention. Note that, in FIG. 2, the same symbols are used for components corresponding to those shown in FIG. 1. As shown in FIG. 2, the lawn mowing vehicle 1 includes a hydraulic pump 31 and an alternator 32. The power system is generally divided into a traveling system S1 and a steering system S2 that are driven by hydraulic pressure transferred from the hydraulic pump 31, and a work system S3 driven by electric current supplied from the alternator 32. In FIG. 2, a path of the hydraulic pressure transferred from the hydraulic pump 31 is indicated by a thick solid line, whereas a path of the electric current supplied from the alternator 32 is indicated by a thin solid line. Further, a path of a signal related to a control system is indicated by a thin broken line.

The hydraulic pump 31 is driven by the power of the engine E, and generates the hydraulic pressure driving the traveling system S1 and the steering system S2. The alternator 32 includes an alternating-current generator 32a driven by the engine E, a converter (AC/DC) 32b converting alternating current from the alternating-current generator 32a into direct current, and a diode 32c, and generates direct current, for instance, having a voltage of 24 V.

The traveling system S1 includes a hydraulic circuit 33 that transfers the hydraulic pressure transferred from the hydraulic pump 31 to the front wheels 11a and 11b and the rear wheel 12. Further, the front wheels 11a and 11b and the rear wheel 12 are equipped with sensors (speed detection units) 34a, 34b and 34c that detect the revolutions per unit time (e.g. revolutions per minute), respectively. Detected results of the sensors 34a to 34c are output to a control device 37, which will be described below. The steering system S2 includes a hydraulic circuit 35 in which the hydraulic pressure is transferred from the hydraulic pump 31 to a power steering mechanism that assists in steering the steering wheel 16.

The electric current supplied from the alternator 32 is input into a work system S3, a lighting device 28, a booster circuit 36, and a control device 37 (a control unit, a speed detection unit, and a data processing unit). The work system S3 includes the electric cylinders 26a and 26b that are shown in FIG. 1, the electric cylinder 26c that is not shown in FIG. 1, the electric reel 22 and the motor 24 that are installed on each of the front reel units 13a and 13b and the rear reel unit 14, switches 38a, 38b and 38c, and motor drivers 39a to 39c. The switches 38a, 38b and 38c are configured so that switching conditions thereof are controlled by the control device 37, and provide an electrical interruption or conduction state between the alternator 32 and the electric cylinders 26a, 26b and 26c. The switch is one example of components of a switching mechanism. Thus, a cylinder driver made up of a semiconductor may be used.

When the switches 38a and 38b enter a closed state (ON state), the direct current from the alternator 32 is supplied to the electric cylinders 26a and 26b. Thereby, the electric cylinders 26a and 26b are driven, and thus the front reel units 13a and 13b are raised or lowered. Although not shown in FIG. 1, the electric cylinder 26c, which elevates the rear reel unit 14, is also equipped with the switch 38c (switch whose switching condition is controlled by the control device 37) similar to the switches 38a and 38b.

The motor drivers 39a, 39b and 39c drive the respective motors 24 installed on the front reel units 13a and 13b and the rear reel unit 14 under the control of the control device 37. Thereby, a rotational speed of the reel 22 installed on each of the front reel units 13a and 13b and the rear reel unit 14 is controlled. The booster circuit 36 is a circuit that enables a voltage of the direct current from the alternator 32 to be boosted by a factor of about 10. The boosted voltage is input into each of the motor drivers 39a, 39b and 39c.

The control device 37 controls operation of the work system S3 of the lawn mowing vehicle 1 in response to an instruction input via the display device 27, and displays information representing a current state of the lawn mowing vehicle 1 (e.g. information representing the traveling speed and rotational speeds of the electric reels 22) on the display device 27. In detail, when an elevating instruction of the front reel units 13a and 13b and the rear reel unit 14 is input via the display device 27, the control device 37 controls ON and OFF states of the switches 38a, 38b and 38c. Further, when a driving instruction of the electric reels 22 installed on the front reel units 13a and 13b and the rear reel unit 14 is given via the display device 27, the control device 37 outputs control signals for the motor drivers 39a to 39c, thereby controlling the rotational speeds of the electric reels 22.

The control device 37 controls the rotational speeds of the electric reels 22 installed on the front reel units 13a and 13b and the rear reel unit 14 on the basis of detected results of the sensors 34a to 34c. This is intended to realize a high quality of lawn mowing even when the traveling speed of the lawn mowing vehicle 1 automatically varies due to ups and downs of the ground despite the lawn mowing vehicle 1 being driven so as to have a constant traveling speed.

When the detected result of the sensor 34c which indicates revolutions per minute of the rear wheel 12 is n [rpm], and an effective diameter of the rear wheel 12 is d [mm], the control device 37 obtains the traveling speed v [km/h] of the lawn mowing vehicle 1 from Equation (1) below.

$$v = (d/10^6) \times \pi \times 60 \times n \qquad (1)$$

To simplify the description, an example in which the traveling speed of the lawn mowing vehicle 1 is obtained on the basis of only the detected result of the sensor 34c is described. However, the traveling speed may be obtained on the basis of the detected results of all the sensors 34a to 34c. When the detected results of the sensors 34a to 34c are different, an average value of the detected results is preferably set to the traveling speed.

The control device 37 controls the motor drivers 39a to 39c so that the rotational speeds of the electric reels 22 installed on the front reel units 13a and 13b and the rear reel unit 14 are proportional to the traveling speed obtained from Equation (1) or vary step-by-step in relation to the traveling speed obtained from Equation (1). Whether the control is performed so as to be proportional or vary step-by-step in relation to the traveling speed is properly determined in consideration of, for example, performance of the motors 24 or the motor drivers 39a to 39c.

The rotational speeds of the electric reels 22 are not necessarily determined by only the traveling speed of the lawn mowing vehicle 1. In addition to the traveling speed of the lawn mowing vehicle 1, the control is performed based on the number of blades provided on each electric reel 22 and a mowing pitch (a target mowing interval of the lawn). In detail, assuming that the number of blades of the electric reel 22 is m [pieces], and the mowing pitch is p [mm], the control device 37 controls the revolutions per minute r [rpm] of the electric reel 22 to the revolutions per minute shown in Equation (2) below.

$$r = (v \times 10^6 / 60) / (m \times p) \quad (2)$$

where p is the mowing interval of the lawn [mm].

Figure 3:
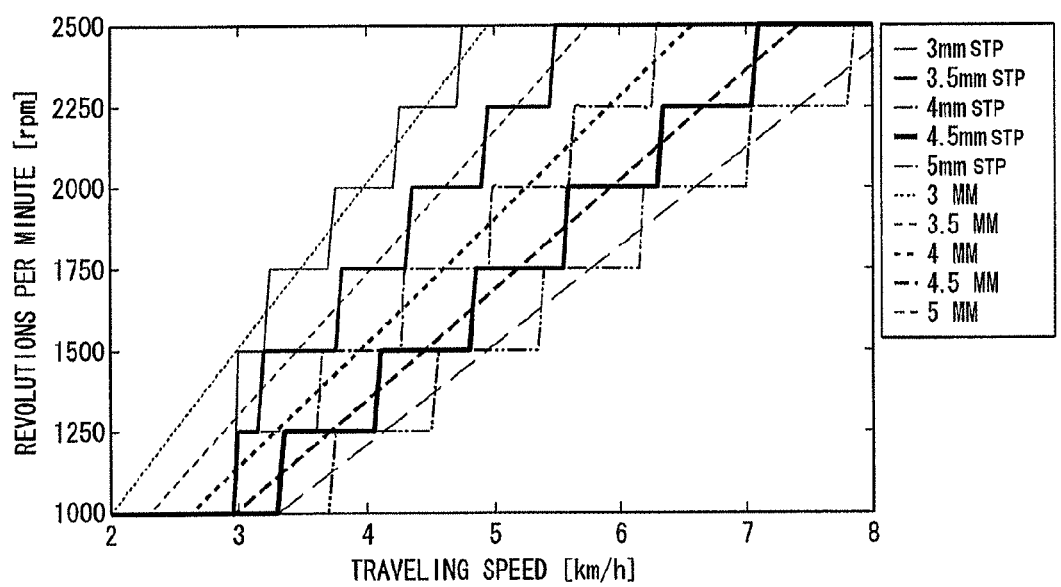
FIG. 3 is a diagram showing an example of a relation between the traveling speed and the revolutions per minute of the electric reel in the lawn mowing vehicle according to the first embodiment of the present invention.

FIG. 3 is a diagram showing an example of a relation between the traveling speed and the revolutions per minute of the electric reel in the lawn mowing vehicle according to the first embodiment of the present invention. In FIG. 3, the traveling speed of the lawn mowing vehicle 1 is shown as an x-axis, and the revolutions per minute of the electric reel 22 is shown as a y-axis. In FIG. 3, the relation between the traveling speed and the revolutions per minute of the electric reel when the mowing pitches are set to 3 mm, 3.5 mm, 4 mm, 4.5 mm, and 5 mm is shown in a graph.

When the rotational speed of the electric reel 22 is controlled so as to be proportional to the traveling speed, the graphs of the respective mowing pitches are indicated as "3 mm," "3.5 mm," "4 mm," "4.5 mm," and "5 mm" by a legend of the right side of the figure. In contrast, when the rotational speed of the electric reel 22 is controlled so as to vary in a stepwise fashion in relation to the traveling speed, the graphs of the respective mowing pitches are indicated as "3 mm STP," "3.5 mm STP," "4 mm STP," "4.5 mm STP," and "5 mm STP" by the legend of the right side of the figure.

Referring to FIG. 3, in either of the case in which the rotational speed of the electric reel 22 is controlled so as to be proportional to the traveling speed and the case in which the rotational speed of the electric reel 22 is controlled so as to vary in a stepwise fashion in relation to the traveling speed, it can be understood that, as the traveling speed increases, the revolutions per minute of the electric reel 22 is controlled so as to increase. Further, when the traveling speed of the lawn mowing vehicle 1 is constant, it can be understood that the revolutions per minute of the electric reel 22 is controlled so as to be increased in inverse proportion to the mowing pitch.

Next, an operation of the lawn mowing vehicle 1 in the aforementioned configuration will be described in brief. When a worker sitting on the seat 15 of the lawn mowing vehicle 1 operates a start key of the engine, the engine E starts.

When the engine E starts, the hydraulic pump 31 is driven, and thus hydraulic pressure for driving the traveling system S1 and the steering system S2 is generated. Further, the alternator 32 is driven by the engine E, thereby generating direct current. The direct current generated by the alternator 32 is supplied to the work system S3, the lighting device 28, the control device 37, and the booster circuit 36. A voltage boosted by the booster circuit 36 is supplied to the work system S3.

The worker operates the steering wheel 16 along with the reverse accelerator pedal 17, the advance accelerator pedal 18, or the brake pedal 19, and drives the lawn mowing vehicle 1 to a position at which a lawn is to be mowed. When the lawn mowing vehicle 1 arrives at the position at which the lawn is to be mowed, the worker operates the display device 27 to give an instruction to lower the front reel units 13a and 13b and the rear reel unit 14. Then, the control device 37 outputs control signals for the switches 38a, 38b and 38c, and thus the front reel units 13a and 13b and the rear reel unit 14 are lowered. Thereby, the lawn is mowed along a travel path of the lawn mowing vehicle 1 by the front reel units 13a and 13b and the rear reel unit 14.

During mowing of the lawn, the control device 37 obtains a traveling speed of the lawn mowing vehicle 1 from a detected result of the sensor 34c (revolutions per minute of the rear wheel 12) using Equation (1) above. Then, the control device 37 obtains revolutions per minute of the electric reel 22 from Equation (2) above using the obtained traveling speed, and controls the motor drivers 39a to 39c. Thereby, the control device 37 controls the revolutions per minute of the electric reels 22 installed on the front reel units 13a and 13b and the rear reel unit 14. In this way, rotational speeds of the electric reels 22 are controlled in response to the traveling speed of the lawn mowing vehicle 1.

As described above, in the present embodiment, since the rotational speeds of the electric reels 22 installed on the front reel units 13a and 13b and the rear reel unit 14 are controlled by controlling the motors 24 based on the detected result of, for instance, the sensor 34c, even when the traveling speed of the lawn mowing vehicle 1 is changed, a high quality of lawn mowing in which the height of the grass is uniform is possible. Further, the mowing vehicle 1 of the present embodiment is a hybrid type lawn mowing vehicle that travels using the pressure of the hydraulic pump driven by the power of the engine and mows the lawn using the power of the electric motors. Since the mowing vehicle 1 can reduce a risk of oil leakage compared to a conventional lawn mowing vehicle that mows a lawn using power of a hydraulic pump, it can reduce the risk of withering the grass caused by oil, compared to the conventional lawn mowing vehicle.

Second Embodiment

Figure 4:
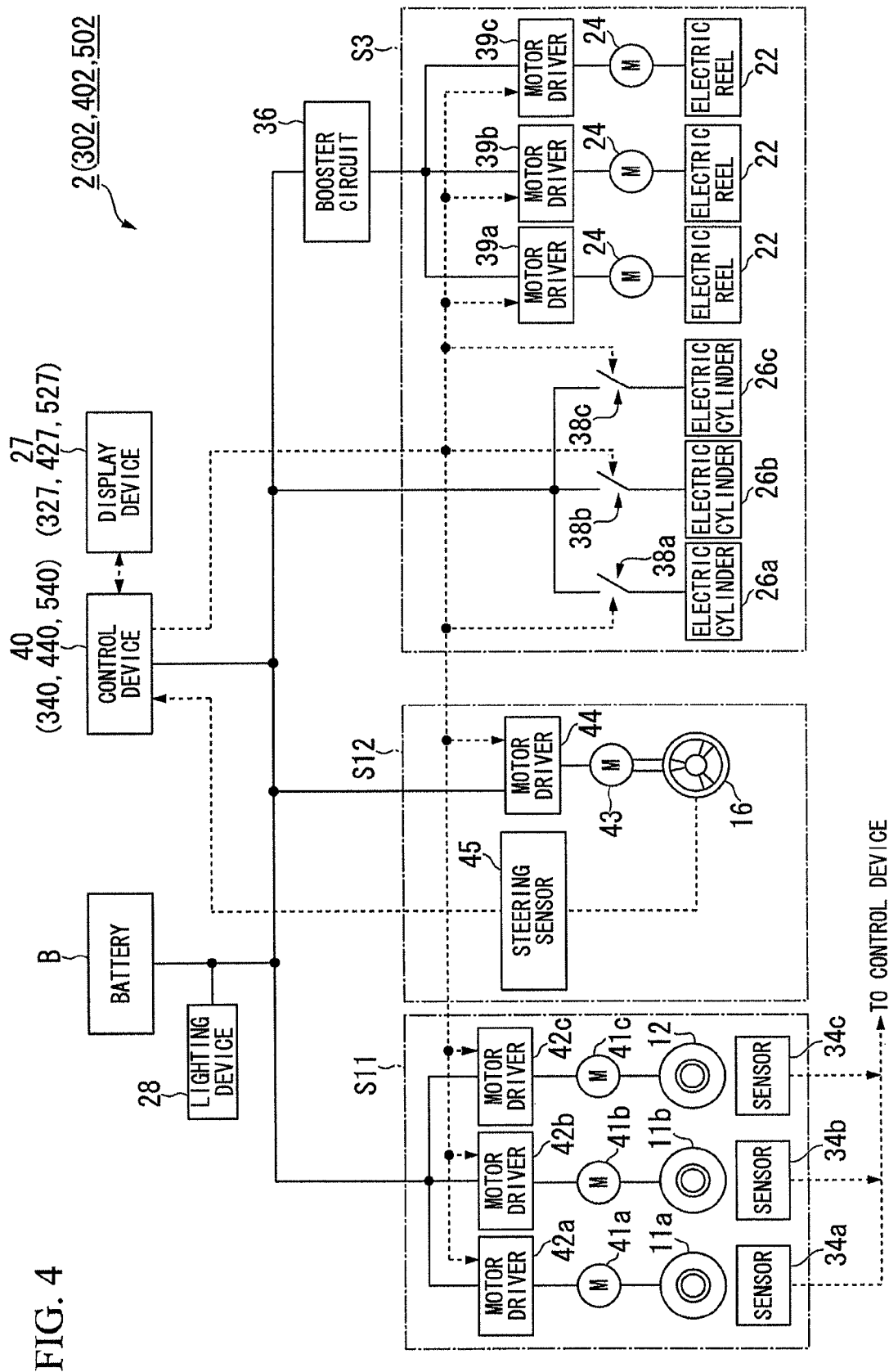
FIG. 4 is a block diagram showing a configuration of essential units of a power system and a control system in a lawn mowing vehicle according to a second embodiment of the present invention.

FIG. 4 is a block diagram showing a configuration of essential units of a power system and a control system in a lawn mowing vehicle according to a second embodiment of the present invention. Note that, in FIG. 4, the same symbols are used for the same blocks as the blocks shown in FIG. 2. The lawn mowing vehicle 2 is an electric lawn mowing vehicle that uses power of, e.g., a motor to travel and to mow a lawn. An external appearance of the lawn mowing vehicle 2 of the present embodiment is almost the same as that of the lawn mowing vehicle 1 of the first embodiment shown in FIG. 1.

As shown in FIG. 4, the lawn mowing vehicle 2 of the present embodiment includes a battery B in place of the engine E, the hydraulic pump 31, and the alternator 32 of FIG. 2. Further, the lawn mowing vehicle 2 includes a traveling system S11 and a steering system S12 in place of the traveling system S1 and the steering system S2 of FIG. 2, and is equipped with a control device 40 (a control unit, and a speed detection unit) in place of the control device 37. In FIG. 4, a path along which electric current is supplied from the battery B is indicated by a thin solid line, and a path of a signal involved in the control system is indicated by a thin broken line.

The battery B supplies direct current to the traveling system S11, the steering system S12, and a work system S3, as well as a lighting device 28, a booster circuit 36, and the control device 40. The battery B generates direct current, for instance, having a voltage of 48 V. The traveling system S11 includes motors 41a, 41b and 41c driving front wheels 11a and 11b and a rear wheel 12 respectively, and motor drivers 42a to 42c driving the respective motors 41a to 41c.

Each of the motor drivers 42a to 42c is supplied with the direct current from the battery B, and a control signal for the control device 40 is supplied to each of the motor drivers 42a to 42c. The motor drivers 42a to 42c drive the respective motors 41a to 41c under control of the control device 40. In the present embodiment, the front wheels 11a and 11b and the rear wheel 12 are also equipped with sensors 34a, 34b and 34c that detect the revolutions per unit time (e.g. revolutions per minute), respectively.

The steering system S12 includes a motor 43, a motor driver 44, and a steering sensor 45, and assists in steering a steering wheel 16 under the control of the control device 40. The motor 43 transfers power to the steering wheel 16, thereby realizing power steering that assists in steering the steering wheel 16. The motor driver 44 drives the motor 43 on the basis of the control signal output from the control device 40. The motor driver 44 is also supplied with the direct current from the battery B. The steering sensor 45 detects an amount of rotation of the steering wheel 16, and outputs the detected result to the control device 40.

Like the control device 37 shown in FIG. 2, the control device 40 controls operation of the work system of the lawn mowing vehicle 2 in response to an instruction input via the display device 27. That is, the control device 40 controls elevations of the front reel units 13a and 13b and the rear reel unit 14 on the basis of the instructions input via the display device 27, and rotational speeds of the electric reels 22 installed on the front reel units 13a and 13b and the rear reel unit 14 on the basis of detected result of the sensors 34a to 34c.

Further, the control device 40 controls the motor driver 44 on the basis of a detected result of the steering sensor 45, thereby realizing the power steering that assists in steering the steering wheel 16. Furthermore, the control device 40 controls an amount of fluctuation at which the rear wheel 12 fluctuates in a leftward/rightward direction on the basis of the detected result of the steering sensor 45, and controls the motor drivers 42a to 42c in response to an amount of operation of, e.g., the reverse accelerator pedal 17. Thereby, the control device 40 controls backward movement, forward movement, stopping, and a traveling speed of the lawn mowing vehicle 2.

Like the lawn mowing vehicle 1 of the first embodiment, the lawn mowing vehicle 2 having the aforementioned configuration is also configured so that the motors 24 are controlled by the control device 40 in response to the detected result of, e.g., the sensor 34c, and thereby the rotational speeds of the electric reels 22 installed on the front reel units 13a and 13b and the rear reel unit 14 are controlled. As such, even when the traveling speed of the lawn mowing vehicle 2 is changed, a high quality of lawn mowing in which grass has a constant height is possible.

Further, the lawn mowing vehicle 2 of the present embodiment is an electric lawn mowing vehicle that uses the power of the motors to travel and to mow the lawn, and thus requires no engine. As such, the lawn mowing vehicle 2 can be made light, formation of wheel tracks can be prevented, and damage to the lawn can be reduced. Further, the lawn mowing vehicle 2 of the present embodiment does not require any hydraulic pressure for driving the traveling system S11 and the steering system S12, and thus has no possibility of oil leakage. As such, withering of the grass caused by leaked oil does not occur.

While the lawn mowing vehicle according to the embodiments of the present invention has been described, the present invention is not limited to the embodiments. The lawn mowing vehicle can be freely modified within the spirit and scope of the present invention. In the embodiments, the lawn mowing vehicle having the electric reels 22 whose rotational shafts are installed in the leftward/rightward direction of the vehicle has been described. However, the present invention may be applied to lawn mowing vehicles having electric reels whose rotational shafts are installed in an upward/downward direction.

Further, not all the rotational speeds of the electric reels 22 installed on the front reel units 13a and 13b and the rear reel unit 14 are essentially controlled so as to be the same. Thus, the rotational speeds of the electric reels 22 may be individually controlled in response to the traveling speed. For example, when the lawn mowing vehicle travels around a curve, the rotational speed of the electric reel 22 installed on the front reel unit 13a may be controlled on the basis of the detected result of the sensor 34a, the rotational speed of the electric reel 22 installed on the front reel unit 13b may be controlled on the basis of the detected result of the sensor 34b, and the rotational speed of the electric reel 22 installed on the rear reel unit 14 may be controlled on the basis of the detected result of the sensor 34c.

Furthermore, in the above embodiments, an example in which the revolutions per minute of the front wheels 11a and 11b and the rear wheel 12 are detected by the sensors 34a to 34c, respectively, and the traveling speed is obtained from the detected results has been described. However, in the lawn mowing vehicle 1 according to the first embodiment, the traveling speed may be obtained by the revolutions per minute and a flow rate of the traveling hydraulic motor and the effective diameters of the front wheels 11a and 11b and the rear wheel 12.

Third Embodiment

Figure 5:
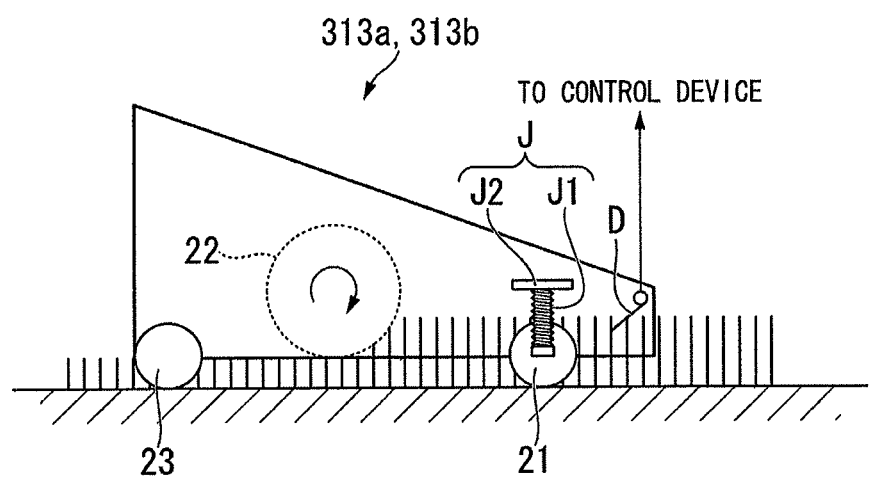
FIG. 5 is a side view schematically showing an internal configuration of front reel units 313a and 313b according to a third embodiment of the present invention.

A third embodiment of the present invention will be described based on FIG. 5. The lawn mowing vehicle 3 related to the present embodiment is different from the lawn mowing vehicle 1 related to the first embodiment in that the lawn mowing vehicle 3 includes a detection sensor D detecting the state of a lawn. Note that, in the lawn mowing vehicle 3, the same symbols are used for constituent elements common with the lawn mowing vehicle 1, and thus a repeated description will be omitted here. Hereinafter, as the lawn mowing vehicle, a riding lawn mowing vehicle will be described as an example. However, the present embodiment may be also applied to a hand-driven lawn mowing vehicle.

The lawn mowing vehicle 3 related to the present embodiment is configured so that the configuration other than the internal configuration of front reel units 313a and 313b is the same as that of the lawn mowing vehicle 1 shown in FIGS. 1 and 2. The internal configuration of front reel units 313*a* and 313*b* is shown in FIG. 5 in a schematic side view. As shown in FIGS. 1 and 5, each of the front reel units 313*a* and 313*b* includes a front roller 21, an electric reel (rotating blade) 22, a rear roller 23, and a motor 24.

The front roller 21 is a substantially cylindrical member whose rotational shaft is set in a leftward/rightward direction of the vehicle and in which a plurality of grooves, each of which is formed in a circumferential direction, are also formed in an axial direction, and are disposed in front of the electric reel 22. The front roller 21 is installed to arrange the grass that has not yet been mowed by the electric reel 22, and to support one of the front reel units 313*a* and 313*b*, which are in a lowered state, on the ground. Height adjustment mechanisms J, which adjust a relative height position between the front roller 21 and the electric reel 22, are installed on left-hand and right-hand ends of the front roller 21.

Each height adjustment mechanism J is made up of a bolt J1 extending in a vertical direction and a nut J2 fitted around the bolt J1. By turning the nut J2 to change a height position of the nut J2 with respect to the bolt J1, the relative height position between the front roller 21 and the electric reel 22 can be adjusted. By adjusting the relative height position between the front roller 21 and the electric reel 22, a mowing height (a target length of grass) can be subjected to precise adjustment, for instance, within a range of several millimeters to tens of millimeters.

The electric reel 22 is interposed between the front roller 21 and the rear roller 23, and is disposed so as to be higher than the front roller 21 and the rear roller 23 by a height of the grass that has been mowed. The rear roller 23 is a substantially cylindrical member in which grooves are formed as in the front roller 21, and is installed to support the front reel unit 313*a* or 313*b*, which is in the lowered state, on the ground, like the aforementioned front roller 21.

Further, a detection sensor D, which detects the state of grass that has not yet been mowed by the electric reel 22, is installed inside the front reel unit 313*a* or 313*b*. Further, the detection sensor D is installed in front of the front roller 21 (in front of the electric reel 22) inside the front reel unit 313*a* or 313*b*, and detects at least one of a height of the grass, a color of the grass, and a standing state of the grass. As a sensor detecting the height of the grass, for example, a touch sensor may be used. As a sensor detecting the color of the grass, an imaging device such as a color charge-coupled device (CCD) may be used. Further, as a sensor detecting the standing state of the grass, a sensor detecting reflectance of light illuminated on the grass may be used. The standing state of the grass is detected using the fact that the reflectance is increased when the grass is lies flat and is reduced when the grass stands. Hereinafter, to simplify the description, the detection sensor D is defined as the sensor that detects the height of the grass.

In the present embodiment, the rear reel unit 314 includes, similar to the front reel units 313*a* and 313*b*, a front roller 21, an electric reel (rotating blade) 22, a rear roller 23, and a motor 24, and is elevated by an elevating mechanism (not shown) having, for instance, an electric cylinder similar to the electric cylinders 26*a* and 26*b*. Like the front reel units 313*a* and 313*b*, the rear reel unit 314 is supported so as to be able to fluctuate around a rotational shaft in a frontward/rearward direction of the vehicle, and can be inclined according to an inclination of the ground in a frontward/rearward direction of the vehicle.

The lawn mowing vehicle 3 related to the present embodiment includes a control device 337 in place of the control device 37 shown in FIG. 2. Further, the lawn mowing vehicle 3 includes a display device 327 in place of the display device 27 shown in FIG. 2. The control device 337 controls rotational speeds of the electric reels 22 installed on the front reel units 313*a* and 313*b* and the rear reel unit 314 on the basis of detected results of the sensors 34*a* to 34*c*. Further, the control device 337 controls the electric cylinders 26*a*, 26*b* and 26*c* so that elevating positions of the front reel units 313*a* and 313*b* are consistent with that of the rear reel unit 314. The controls are intended to realize a high quality of lawn mowing even when a traveling speed of the lawn mowing vehicle 3 automatically varies due to ups and downs of the ground despite the lawn mowing vehicle 3 being driven so as to have a constant traveling speed.

Further, the control device 337 performs a predetermined process on a detected result of the detection sensor D, and then generates growth data indicating a growth state of the lawn. In detail, the control device 337 generates a state map, which indicates the state of the lawn at each place at which the lawn is mowed each time the lawn is mowed. The lawn is typically mowed at the same place each day or every several days using the lawn mowing vehicle 3. Thus, the control device 337 detects a previous height of the grass at a place (region) at which the lawn is repetitively mowed whenever the lawn is mowed using the detection sensor D, and generates the state map indicating a planar distribution of the detected heights (distribution at the place at which the lawn is mowed). The growth data is output to the display device 327. Thereby, information that indicates the growth state of the lawn is displayed on the display device 327.

It is preferable that, in addition to the detection sensor D, at least one of temperature and humidity sensors (environmental sensors) be installed, and the control device 337 perform a process of causing temperature or humidity detected by the temperature sensor or the humidity sensor to be included in the growth data. By performing such a process, information indicating the temperature or the humidity is added to the growth data representing the growth state of the lawn. As such, it is possible to provide a worker with more useful information.

During mowing of the lawn, the control device 337 obtains travel distances of the front wheels 11*a* and 11*b* and the rear wheel 12 from the detected results of the sensors 34*a* to 34*c*, thereby obtaining a travel path of the lawn mowing vehicle 3. Then, the obtained travel path and the detected result of the detection sensor D are mapped to each other, and the state map indicating the planar distribution of the heights of the grass is generated. Thereby, the growth data is generated. Further, the control device 337 performs the process of causing the temperature or the humidity detected by the temperature sensor or the humidity sensor to be included in the growth data as needed. During mowing of the lawn, under the control of the control device 337, a traveling speed of the lawn mowing vehicle 3 is obtained from the detected result of the sensor 34*c*, and revolutions per minute of the electric reels 22 installed on the front reel units 313*a* and 313*b* and the rear reel unit 314 are changed in response to the obtained traveling speed.

When the mowing of the lawn is terminated and the worker gives a display instruction of the growth data to the display device 327, the state map generated by the control device 337 is displayed on the display device 327. Among the growth data generated by the control device 337, a predetermined number of data elements generated most recently are stored in the control device 337. As such, when the worker gives a predetermined instruction to the display device 327, the growth data generated before being stored can be displayed on the display device 327.

As described above, in the present embodiment, the state of the lawn is detected by the detection sensor D, and the predetermined process is performed on the detected result. Thereby, the growth data indicating the growth situation of the lawn is generated, and the generated growth data is displayed. As such, it is possible to provide useful information to the worker in managing the lawn. Further, in the present embodiment, since the rotational speeds of the electric reels 22 installed on the front reel units 313a and 313b and the rear reel unit 314 are controlled according to the detected results of, e.g., the sensor 34c, even when the traveling speed of the lawn mowing vehicle 3 is changed, a high quality of lawn mowing in which the grass has a constant height is possible. In addition, the lawn mowing vehicle 3 of the present embodiment is a hybrid type lawn mowing vehicle that travels using the pressure of the hydraulic pump driven by the power of the engine and mows the lawn using the power of the electric motors. Since the lawn mowing vehicle 3 can reduce a risk of oil leakage compared to a conventional lawn mowing vehicle that mows a lawn using power of a hydraulic pump, it can reduce the risk of withering the grass caused by oil, compared to the conventional lawn mowing vehicle.

Modification of Third Embodiment

Like the lawn mowing vehicle 2 related to the second embodiment, a modification of the lawn mowing vehicle 3 related to the present embodiment may be a lawn mowing vehicle 302 that includes a battery 13 in place of the engine E, the hydraulic pump 31, and the alternator 32. In this case, the lawn mowing vehicle 302 is equipped with a traveling system S11 and a steering system S12 in place of the traveling system S1 and the steering system S2. Further, the lawn mowing vehicle 302 is equipped with a control device (data processing unit) 340 in place of the control device 337.

The lawn mowing vehicle 302 is also configured so that the state of a lawn is detected by a detection sensor D, so that a predetermined process is performed on the detected result, so that growth data indicating a growth situation of the lawn is generated, and so that the generated growth data is displayed. As such, it is possible to provide useful information to a worker in managing the lawn. Further, in the present embodiment, rotational speeds of electric reels 22 installed on front reel units 313a and 313b and a rear reel unit 314 are controlled according to detected results of, e.g., a sensor 34c. As such, even when a traveling speed of the lawn mowing vehicle 302 is changed, a high quality of lawn mowing in which the grass has a constant height is possible.

Fourth Embodiment

Hereinafter, a fourth embodiment of the present invention will be described based on FIG. 6. The lawn mowing vehicle 4 related to the fourth embodiment of the present invention is similar to the lawn mowing vehicle 1 shown in FIGS. 1 and 2, except that it includes a control device 437 in place of the control device 37 shown in FIG. 2 and a display device 427 in place of the display device 27 shown in FIG. 2. Note that the same symbols are used for constituent elements common with the lawn mowing vehicle 1, and thus a repeated description will be omitted. Hereinafter, as the lawn mowing vehicle, a riding lawn mowing vehicle will be described as an example.

In the present embodiment, two front reel units 13a and 13b constitute a first reel unit (electric reel unit). A rear reel unit 14 is configured as a second reel unit (electric reel unit).

In the present embodiment, support arms 25a and 25b, and electric cylinders 26a and 26b constitute a first elevating mechanism that elevates the front reel units 13a and 13b. Further, the rear reel unit 14 includes, similar to the front reel units 13a and 13b, a front roller 21, an electric reel (rotating blade) 22, a rear roller (not shown), and a motor 24, and is elevated by an elevating mechanism (second elevating mechanism) (not shown) that includes an electric cylinder (electric actuator) 26c similar to the electric cylinders 26a and 26b.

In the lawn mowing vehicle 4, an "automatic operation mode" that elevates the front reel units 13a and 13b and the rear reel unit 14 in cooperation of the front reel units 13a and 13b with the rear reel unit 14 and a "manual operation mode" that individually and manually elevates the front reel units 13a and 13b and the rear reel unit 14 are provided as operation modes. A worker operates the display device 427, and thereby the "automatic operation mode" or the "manual operation mode" is set.

When the operation mode is set to the "automatic operation mode," the control device 437 controls the electric cylinders 26a, 26b and 26c on the basis of detected results of sensors 34a to 34c so that elevating positions of the front reel units 13a and 13b are consistent with that of the rear reel unit 14. This is intended to realize a high quality of lawn mowing even when a traveling speed of the lawn mowing vehicle 4 automatically varies due to ups and downs of the ground despite the lawn mowing vehicle 4 being driven so as to have a constant traveling speed.

The control device 437 calculates a travel distance (travel distance from the position at which the front reel units 13a and 13b are elevated) by integrating the traveling speed obtained using Equation (1) above from a point of time at which the front reel units 13a and 13b are elevated. Then, the control device 437 performs control of elevating the rear reel unit 14 at a position at which the calculated travel distance becomes a distance L between the front reel units 13a and 13b and the rear reel unit 14. By performing such control, a time from when the front reel units 13a and 13b begin to be elevated to when the rear reel unit 14 begins to be elevated is changed in response to the traveling speed. As such, even when the traveling speed is changed, the elevating positions of the front reel units 13a and 13b can be consistent with that of the rear reel unit 14.

Furthermore, the control device 437 controls motor drivers 39a to 39c so that the rotational speeds of the electric reels 22 installed on the front reel units 13a and 13b and the rear reel unit 14 are proportional to the traveling speed obtained from Equation (1) or vary step-by-step in relation to the traveling speed obtained from Equation (1). Whether the control is performed so as to be proportional or vary step-by-step in relation to the traveling speed is properly determined in consideration of, e.g., performance of the motors 24 or the motor drivers 39a to 39c.

Figure 6A:
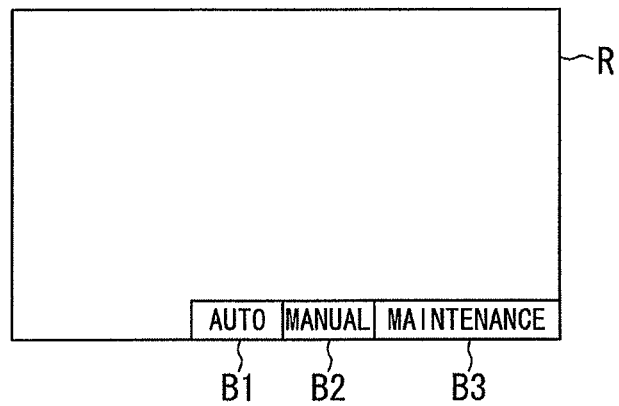
FIG. 6A is a view showing one example of displayed contents of a display device 427 provided to a lawn mowing vehicle 4 according to a fourth embodiment of the present invention.

As shown in FIG. 6A, selection buttons B1 to B3 used to select the operation mode are displayed on a lower portion of the entire display region R of the display device 427. The selection button B1 is a button that sets the operation mode to the "automatic operation mode." The selection button B2 is a button that sets the operation mode to a "manual operation mode." Further, the selection button B3 is a button that sets the operation mode to a "maintenance mode" in which each unit of the lawn mowing vehicle 4 is manually operated so as to perform a variety of maintenance tasks on the lawn mowing vehicle 4.

As shown in FIG. 6A, selection buttons B1 to B3 used to select the operation mode are displayed on a lower portion of the entire display region R of the display device 427. The selection button B1 is a button that sets the operation mode to the "automatic operation mode." The selection button B2 is a button that sets the operation mode to a "manual operation mode." Further, the selection button B3 is a button that sets the operation mode to a "maintenance mode" in which each unit of the lawn mowing vehicle 4 is manually operated so as to perform a variety of maintenance tasks on the lawn mowing vehicle 4.

Figure 6B:
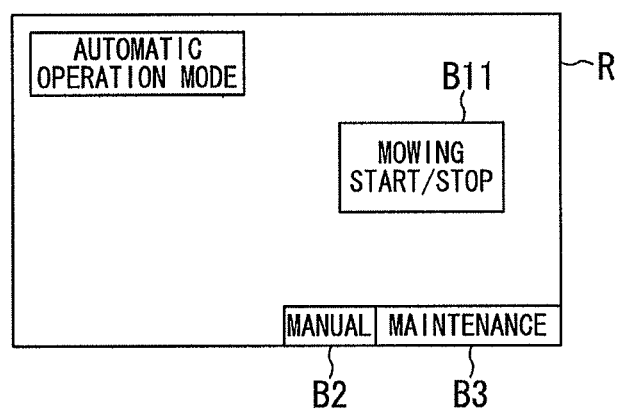
FIG. 6B is a view showing one example of the displayed contents of the display device 427 provided in the lawn mowing vehicle 4 according to the fourth embodiment of the present invention.

When a worker operates the selection button B1, the operation mode becomes the "automatic operation mode." Then, as shown in FIG. 6B, the selection button B1 is erased from the entire display region R, and a button B11 instructing start and stop of the mowing is displayed. When the worker drives the lawn mowing vehicle 4 to arrive at a position at which a lawn is to be mowed and then pushes the button B11 displayed on the entire display region R of the display device 427, control signals from the control device 437 are output for the switches 38a and 38b, and thus the front reel units 13a and 13b are lowered. Thereby, the lawn is mowed along the travel path of the lawn mowing vehicle 4 by the front reel units 13a and 13b.

The control device 437 calculates a travel distance by obtaining a traveling speed of the lawn mowing vehicle 4 from the detected result of the sensor 34c (revolutions per minute of the rear wheel 12) using Equation (1) above and by integrating the obtained traveling speed from a point of time at which the front reel units 13a and 13b are lowered. Then, the control device 437 performs control of lowering the rear reel unit 14 at a position at which the calculated travel distance becomes the distance L between the front reel units 13a and 13b and the rear reel unit 14. Thereby, even when the traveling speed is changed, the position at which the rear reel unit 14 is lowered can be consistent with that at which the front reel units 13a and 13b are lowered.

When the worker pushes the button B11 displayed on the entire display region R of the display device 427 again, control signals from the control device 437 are output for the switches 38a and 38b, and thus the front reel units 13a and 13b are raised. Thereby, the mowing of the lawn by the front reel units 13a and 13b is terminated. When the button B11 is pushed, the control device 437 calculates a travel distance by obtaining a traveling speed of the lawn mowing vehicle 4 from the detected result of the sensor 34c (revolutions per minute of the rear wheel 12) using Equation (1) above and by integrating the obtained traveling speed, as in the case in which the front reel units 13a and 13b are lowered. Then, the control device 437 performs control of raising the rear reel unit 14 at a position at which the calculated travel distance becomes the distance L between the front reel units 13a and 13b and the rear reel unit 14. Thereby, even when the traveling speed is changed, the position at which the rear reel unit 14 is raised can be consistent with that at which the front reel units 13a and 13b are raised.

Figure 6C:
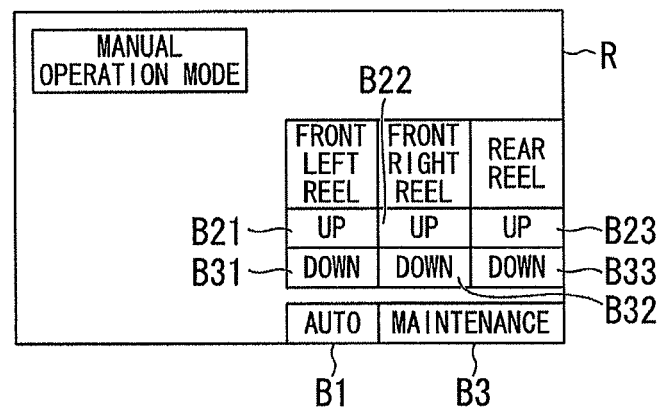
FIG. 6C is a view showing one example of the displayed contents of the display device 427 provided in the lawn mowing vehicle 4 according to the fourth embodiment of the present invention.

In the case in which the display shown in FIG. 6A is made by the display device 427, when the worker operates the button B2, the operation mode becomes the "manual operation mode." Then, as shown in FIG. 6C, the button B2 is erased from the entire display region R, buttons B21 and B31 for raising and lowering the front reel unit 13b, buttons B22 and B32 for raising and lowering the front reel unit 13a, and buttons B23 and B33 for raising and lowering the rear reel unit 14 are displayed. The worker individually operates these buttons. Thereby, the electric cylinders 26a, 26b, 26c, and so on are individually controlled by the control device 437, so that the front reel units 13a and 13b and the rear reel unit 14 can be individually raised or lowered.

As described above, in the present embodiment, on the basis of the detected result of, e.g., the sensor 34c, the traveling speed is obtained and the travel distance is calculated. The control is performed so that the elevating positions of the front reel units 13a and 13b are consistent with that of the rear reel unit 14. As such, even when the traveling speed of the lawn mowing vehicle 4 is changed, a high quality of lawn mowing is possible. Further, the lawn mowing vehicle 4 of the present embodiment is a hybrid type lawn mowing vehicle that travels using the pressure of the hydraulic pump driven by the power of the engine and mows the lawn using the power of the electric motors. Since the lawn mowing vehicle 4 can reduce a risk of oil leakage compared to a conventional lawn mowing vehicle that mows a lawn using power of a hydraulic pump, it can reduce a risk of withering the grass caused by oil, compared to the conventional lawn mowing vehicle.

Modification of Fourth Embodiment

Like the lawn mowing vehicle 2 related to the second embodiment, a modification of the lawn mowing vehicle 4 related to the present embodiment may be a lawn mowing vehicle 402 that includes a battery B in place of the engine E, the hydraulic pump 31, and the alternator 32. In this case, the lawn mowing vehicle 402 is equipped with a traveling system S11 and a steering system S12 in place of the traveling system S1 and the steering system S2. Further, the lawn mowing vehicle 402 is equipped with a control device (control unit, speed detection unit) 440 in place of the control device 437.

Like the riding lawn mowing vehicle 4 of the fourth embodiment, the lawn mowing vehicle 402 is controlled by the control device 440 so that the elevating positions of the front reel units 13a and 13b are consistent with that of the rear reel unit 14 based on the detected result of, e.g., the sensor 34c. As such, even when the traveling speed of the lawn mowing vehicle 402 is changed, a high quality of lawn mowing in which the grass has a uniform height is possible.

Fifth Embodiment

Hereinafter, a fifth embodiment of the present invention will be described based on FIG. 7. The lawn mowing vehicle 5 related to the fifth embodiment of the present invention is similar to the lawn mowing vehicle 1 shown in FIGS. 1 and 2, except that it includes a control device 537 in place of the control device 37 shown in FIG. 2 and a display device 527 in place of the display device 27 shown in FIG. 2. The lawn mowing vehicle 5 is similar to the lawn mowing vehicle 4 related to the fourth embodiment of the present invention in that an "automatic operation mode" and a "manual operation mode" are provided as operation modes. The present embodiment has a control method different from the fourth embodiment in that, in the "automatic operation mode," front reel units 13a and 13b and a rear reel unit 14 are individually elevated. Note that the same symbols are used for constituent elements common with the lawn mowing vehicle 1 or 4, and thus a repeated description will be omitted.

In the present embodiment, the two front reel units 13a and 13b are configured as a first reel unit and a second reel unit (electric reel units). Further, a support arm 25a and an electric cylinder 26a constitute a first elevating mechanism that elevates the front reel unit 13a, whereas a support arm 25b and an electric cylinder 26b constitute a second elevating mechanism that elevates the front reel unit 13b.

In the present embodiment, the control device 537 controls an operation of a work system S3 of the lawn mowing vehicle 5 in response to an instruction input via the display device 527, and displays information (e.g., information indicating a traveling speed and rotational speeds of electric reels 22) indicating a current state of the lawn mowing vehicle 5 on the display device 527. In detail, when instructions to elevate the front reel units 13a and 13b and the rear reel unit 14 are input via the display device 527, the control device 537 controls ON and OFF states of, e.g., switches 38a, 38b and 38c, and controls the rotational speed of the electric reel of the lowered reel unit among the front reel units 13a and 13b and the rear reel unit 14. Further, apart from the instructions to elevate the front reel units 13a and 13b and the rear reel unit 14, an instruction to drive the electric reels 22 installed on the front reel units 13a and 13b and the rear reel unit 14 is given via the display device 527, and the control device 537 outputs control signals for motor drivers 39a to 39c, and thus the rotational speeds of the electric reels 22.

When the operation mode is set to the "automatic operation mode," the control device 537 controls the electric cylinders 26a, 26b and 26c on the basis of detected results of sensors 34a to 34c so that elevating positions of the front reel units 13a and 13b are consistent with that of the rear reel unit 14. This is intended to realize a high quality of lawn mowing even when a traveling speed of the lawn mowing vehicle 5 automatically varies due to ups and downs of the ground despite the lawn mowing vehicle 5 being driven so as to have a constant traveling speed. A detailed description will be made below. However, even when the operation mode is set to the "automatic operation mode," an elevating reel unit may be selected from the front reel units 13a and 13b and the rear reel unit 14. As such, for example, any one of the front reel units 13a and 13b may be elevated in cooperation with the elevation of the rear reel unit 14.

In the present embodiment, the rotational speeds of the electric reels are not necessarily determined only by the traveling speed of the lawn mowing vehicle 5. In addition to the traveling speed of the lawn mowing vehicle 5, the control is performed based on the number of blades provided on each electric reel 22 and a mowing pitch (a target height of the grass). In detail, assuming that the number of blades of the electric reel 22 is m [pieces], and the mowing pitch is p [mm], the control device 537 controls the revolutions per minute r [rpm] of the electric reel 22 such that the revolutions per minute satisfies Equation (3) below.

$$r = (v \times 10^6/60)/(m \times p) \quad (3)$$

where p is the target height of the grass [mm].

Next, an operation of the lawn mowing vehicle 5 in the aforementioned configuration will be described in brief. The operation of a worker starting the engine E of the lawn mowing vehicle 5 and driving the lawn mowing vehicle 5 to a position at which a lawn is to be mowed is the same as in the lawn mowing vehicle 1 or 4. Before the lawn is mowed, the worker operates the display device 527 to set the operation mode to the "automatic operation mode" or the "manual operation mode." FIGS. 7A to 7D are views showing one example of displayed contents of the display device 527 provided in the lawn mowing vehicle 5 according to the present embodiment. The displayed contents shown in FIGS. 7A to 7D are merely one example, and the displayed contents or their display positions may be appropriately modified.

Figure 7A:
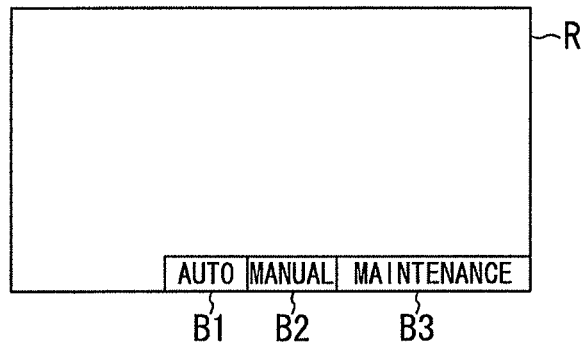
FIG. 7A is a view showing one example of displayed contents of a display device 527 provided in a lawn mowing vehicle 5 according to a fifth embodiment of the present invention.
Figure 7B:
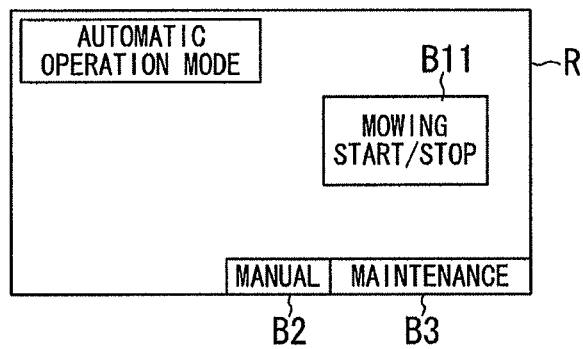
FIG. 7B is a view showing one example of the displayed contents of the display device 527 provided in the lawn mowing vehicle 5 according to the fifth embodiment of the present invention.

When a worker operates the selection button B1, the operation mode becomes the "automatic operation mode." Then, as shown in FIG. 7B, the button B1 is erased from the entire display region R, and a button B11 instructing start and stop of the mowing is displayed. When the worker drives the lawn mowing vehicle 5 to arrive at a position at which a lawn is to be mowed and then pushes the button B11 displayed on the entire display region R of the display device 527, control signals from the control device 537 are output for the switches 38a and 38b and the motor drivers 39a and 39b. Thus, the front reel units 13a and 13b are lowered and the electric reels 22 of the front reel units 13a and 13b are rotated. Thereby, the lawn is mowed along the travel path of the lawn mowing vehicle 5 by the front reel units 13a and 13b.

When the worker pushes the button B11 displayed on the entire display region R of the display device 527 again, control signals from the control device 437 are output for the switches 38a and 38b and the motor drivers 39a and 39b. Thus, the front reel units 13a and 13b are raised, and the electric reels 22 of the front reel units 13a and 13b are stopped. Thereby, the mowing of the lawn by the front reel units 13a and 13b is terminated. When the button B11 is pushed, the control device 537 calculates a travel distance by obtaining a traveling speed of the lawn mowing vehicle 5 from the detected result of the sensor 34c (revolutions per minute of the rear wheel 12) using Equation (1) above and by integrating the obtained traveling speed, as in the case in which the front reel units 13a and 13b are lowered. Then, the control device 537 performs control of raising the rear reel unit 14 at a position at which the calculated travel distance becomes the distance L between the front reel units 13a and 13b and the rear reel unit 14. Thereby, even when the traveling speed is changed, the position at which the rear reel unit 14 is raised can be consistent with that at which the front reel units 13a and 13b are raised.

Figure 7C:
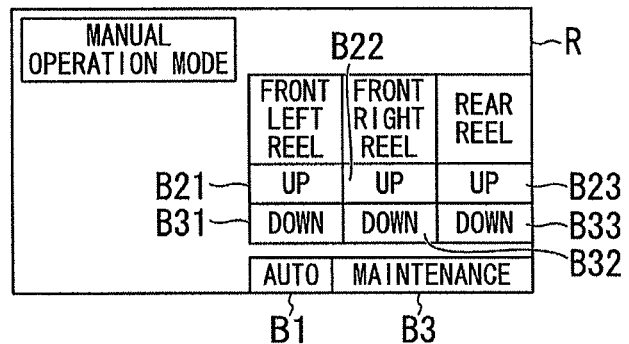
FIG. 7C is a view showing one example of the displayed contents of the display device 527 provided in the lawn mowing vehicle 5 according to the fifth embodiment of the present invention.
Figure 7D:
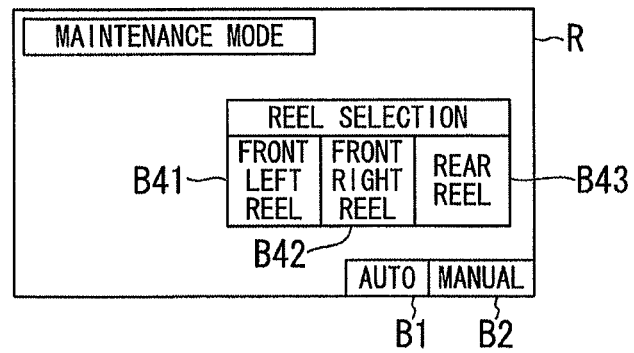
FIG. 7D is a view showing one example of the displayed contents of the display device 527 provided in the lawn mowing vehicle 5 according to the fifth embodiment of the present invention.

In the case in which the display shown in FIG. 7A is made by the display device 527, when the worker operates the button B3, the operation of the lawn mowing vehicle 5 enters a "maintenance mode." Then, as shown in FIG. 7D, the button B3 is erased from the entire display region R, and buttons B41 to B43 that select an elevating reel unit (an operating reel unit) among from the front reel units 13a and 13b and the rear reel unit 14 are displayed. Now, the case in which a width of the lawn to be mowed is a width mowed by the front reel unit 13a and the rear reel unit 14, and in which the front reel unit 13b need not be used to mow the lawn will be taken into consideration. In such a case, the worker operates a button B42 and a button B43 shown in FIG. 7D to select only the front reel unit 13a and the rear reel unit 14.

After the aforementioned selection is made, when the worker operates the selection button B1, the operation mode becomes the "automatic operation mode," and the button B11 shown in FIG. 7B is displayed. Then, when the worker pushes the button B11, only the front reel unit 13a not selected to be in the maintenance mode is lowered by the control of the control device 53, and the electric reel 22 of the front reel unit 13a is rotated. Thereby, the lawn is mowed by the front reel unit 13a. In this case, the electric reel 22 of the front reel unit 13b is still stopped.

Then, the control device 537 performs control of lowering the rear reel unit 14 to rotate the electric reel 22 of the rear reel unit 14 at a position at which the travel distance from a position at which the front reel unit 13a is lowered becomes the distance L between the front reel units 13a and 13b and the rear reel unit 14. Due to this control, the position at which the rear reel unit 14 is lowered can be consistent with that at which the front reel unit 13a is lowered.

Afterwards, when the worker pushes the button B11 again, control of raising the front reel unit 13a and control of stopping the electric reel 22 of the front reel unit 13a are performed by the control device 537. Then, the control device 537 performs control of raising the rear reel unit 14 to rotate the electric reel 22 of the rear reel unit 14 at a position at which the travel distance from a position at which the front reel unit 13a is raised becomes the distance L between the front reel units 13a and 13b and the rear reel unit 14. Thereby, the position at which the rear reel unit 14 is raised can be consistent with that at which the front reel unit 13a is raised.

In the case in which the display shown in FIG. 7A is made by the display device 527, when the worker operates the button B2, the operation mode becomes the "manual operation mode." Then, as shown in FIG. 7C, the button B2 is erased from the entire display region R, buttons B21 and B31 for raising and lowering the front reel unit 13b, buttons B22 and B32 for raising and lowering the front reel unit 13a, and buttons B23 and B33 for raising and lowering the rear reel unit 14 are displayed. The worker individually operates these buttons. Thereby, the electric cylinders 26a, 26b, 26c, and so on are individually controlled by the control device 537, so that the front reel units 13a and 13b and the rear reel unit 14 can be individually raised or lowered.

As described above, in the present embodiment, the front reel units 13a and 13b and the rear reel unit 14 are individually elevated. Thereby, the mowing width can be freely changed depending on the lawn to be mowed. Thereby, a portion of the lawn which is mowed several times can be reduced, and a high quality of lawn mowing is possible. Further, the lawn mowing vehicle 4 of the present embodiment is a hybrid type lawn mowing vehicle that travels using the pressure of the hydraulic pump driven by the power of the engine and mows the lawn using the power of the electric motors. Since the lawn mowing vehicle 4 can reduce a risk of oil leakage compared to a conventional lawn mowing vehicle that mows a lawn using power of a hydraulic pump, it can reduce a risk of withering the grass caused by oil, compared to the conventional lawn mowing vehicle. Furthermore, the elevation of the front reel units 13a and 13b and the rear reel unit 14 and the rotation of the electric reels 22 installed on these reel units can be precisely controlled, and thus consumption power can be reduced.

Modification of Fifth Embodiment

Like the lawn mowing vehicle 2 related to the second embodiment, a modification of the lawn mowing vehicle 5 related to the present embodiment may be a lawn mowing vehicle 502 that includes a battery B in place of the engine E, the hydraulic pump 31, and the alternator 32. In this case, the lawn mowing vehicle 502 is equipped with a traveling system S11 and a steering system S12 in place of the traveling system S1 and the steering system S2. Further, the lawn mowing vehicle 502 is equipped with a control device (control unit, speed detection unit) 540 in place of the control device 537.

Like the riding lawn mowing vehicle 5 of the fifth embodiment, the lawn mowing vehicle 502 is also configured so that the elevations of the front reel units 13a and 13b and the rear reel unit 14 are individually controlled by the control device 540. Further, the lawn mowing vehicle 502 is controlled by the control device 540 so that the elevating positions of the front reel units 13a and 13b are consistent with that of the rear reel unit 14 based on the detected result of, e.g., the sensor 34c. As such, even when the traveling speed of the lawn mowing vehicle 502 is changed, or even when the width at which the lawn is to be mowed is narrow, a high quality of lawn mowing in which the grass has a uniform height is possible.

Further, like the lawn mowing vehicle 5, since the elevation of the front reel units 13a and 13b and the rear reel unit 14 and the rotation of the electric reels 22 installed on these reel units can be precisely controlled, consumption power can be reduced.

Further, sensors detecting the state of the lawn are installed on the front reel units 13a and 13b and the rear reel unit 14, respectively. On the basis of detected results of the sensors, the control device 540 may control whether or not to rotate the electric reels 22 installed on the front reel units 13a and 13b and the rear reel unit 14.

Due to this control, the lawn mowing vehicle travels only in the state in which all of the front reel units 13a and 13b and the rear reel unit 14 are lowered, and thereby the electric reels 22 installed on the front reel units 13a and 13b and the rear reel unit 14 are automatically rotated or stopped depending on the height of the grass. As such, only the grass required to be mowed can be mowed. The sensor detecting the state of the lawn may include a height detection sensor that detects the height of the grass using, e.g., a laser sensor, or a visual sensor that performs image processing on a captured image and monitors the state of the lawn.

Further, the aforementioned embodiment has been described regarding the example in which the worker operates the display device 527, and thereby the elevating reel unit is selected from among the front reel units 13a and 13b and the rear reel unit 14. However, a mechanical button or lever for selecting the reel unit may be installed, and the worker may operate the button or lever. Thereby, the elevating reel unit may be selected.

INDUSTRIAL APPLICABILITY

In the present invention, the motors are controlled depending on the detected results of the speed detection units, and thereby the rotational speeds of the rotating blades installed on the electric reel units are controlled. Further, the first and second elevating mechanisms are controlled depending on the detected results of the speed detection units so that the elevating positions of the first reel units are consistent with that of the second reel unit. Furthermore, the control unit can control the first and second elevating mechanisms, each of which has the electric actuator, to individually elevate the first and second reel units, and elevate and operate a minimum necessary reel unit to mow the lawn. Thereby, the high quality of lawn mowing is possible. Further, in the present invention, the state of the lawn mowed by the rotating blade is detected by the detection sensor, and a predetermined process is performed on the detected result of the detection sensor. Thereby, the growth data indicating the growth situation of the lawn is generated. The generated growth data is displayed on the display unit. Thereby, it is possible to provide a higher value-added lawn mowing vehicle that can provide useful information in managing the lawn.

The invention claimed is:

1. A lawn mowing vehicle having first and second reel units disposed at positions that are different from each other in a frontward/rearward direction thereof with respect to a traveling direction, the lawn mowing vehicle comprising:
a first elevating mechanism that elevates the first reel unit using an electric actuator;
a second elevating mechanism that elevates the second reel unit using an electric actuator;
a speed detection unit that detects a traveling speed of the vehicle; and
a control unit configured to control the first and second elevating mechanisms such that an elevating position of the first reel unit is separated by a calculated travel distance of the vehicle from an elevating position of the second reel unit, the calculated travel distance being calculated based on the traveling speed detected by the speed detection unit, whereby the control unit is configured to change a time from when the first reel unit begins to be elevated to when the second reel unit begins to be elevated depending on the traveling speed detected by the speed detection unit, wherein the first and second reel units are electric reel units, each of which has a rotating blade driven by a motor and is configured so that a rotational shaft of the rotating blade is set in the leftward/rightward direction that intersects the traveling direction of the vehicle.

2. The lawn mowing vehicle according to claim 1, further comprising an input unit that inputs an instruction of whether or not to perform automatic elevation control that is control of matching elevating positions of the first and second reel units with each other, wherein the control unit performs the automatic elevation control when the instruction to perform the automatic elevation control is received from the input unit.

3. The lawn mowing vehicle according to claim 2, wherein, when there is no instruction to perform the automatic elevation control, the control unit controls the first and second reel units so as to be individually elevated depending on the instruction input from the input unit.

4. The lawn mowing vehicle according to claim 1, wherein the calculated travel distance is equal to a distance between the first reel unit and the second reel unit.

5. The lawn mowing vehicle according to claim 1, wherein the control unit is configured to calculate the calculated travel distance by integrating the traveling speed detected by the speed detection unit from a time when the first reel unit begins to be elevated.

* * * * *